March 22, 1932. P. IVERSON 1,850,109
VEGETABLE SLICER
Filed July 11, 1929 3 Sheets-Sheet 1
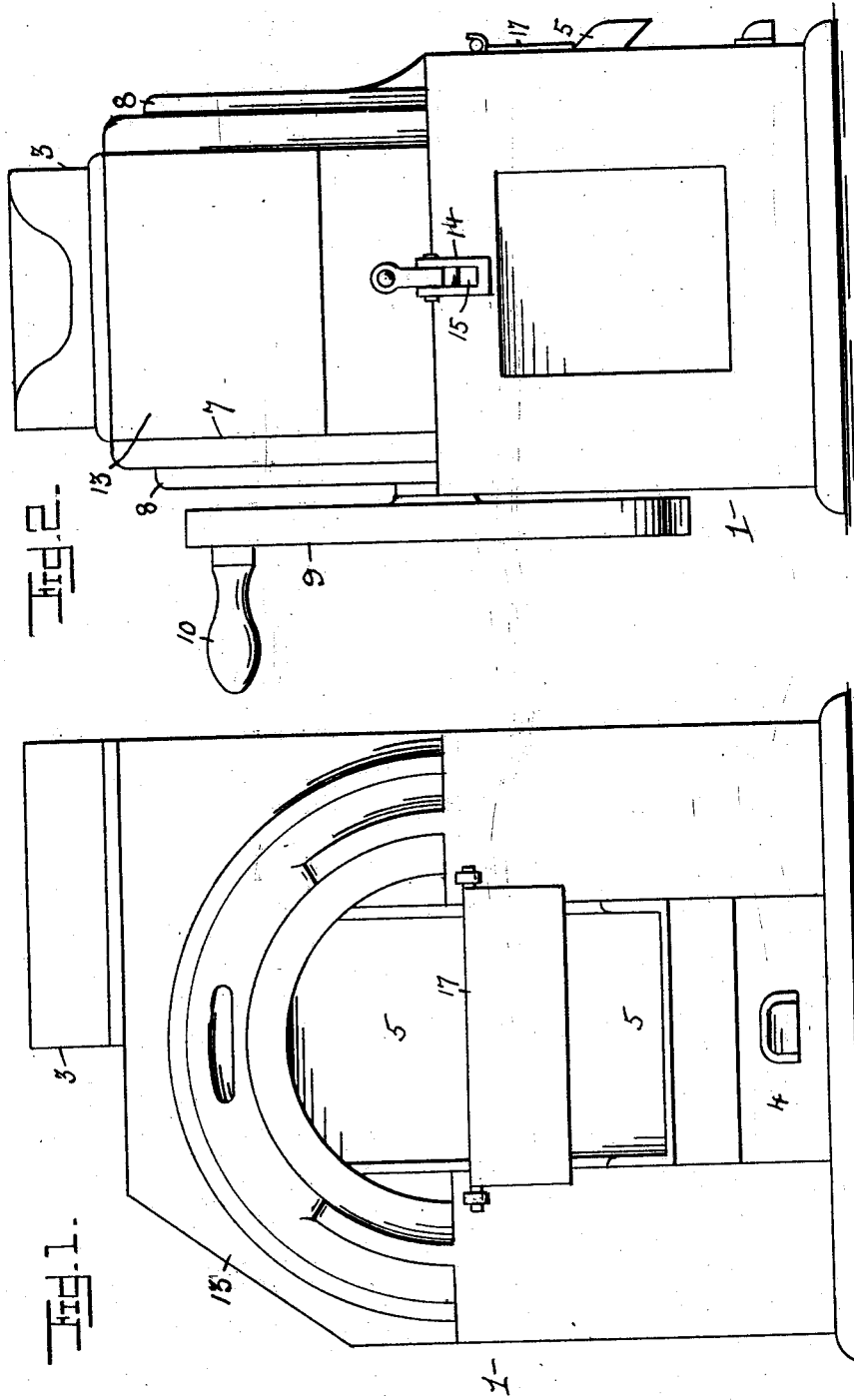

March 22, 1932. P. IVERSON 1,850,109
VEGETABLE SLICER
Filed July 11, 1929 3 Sheets-Sheet 2
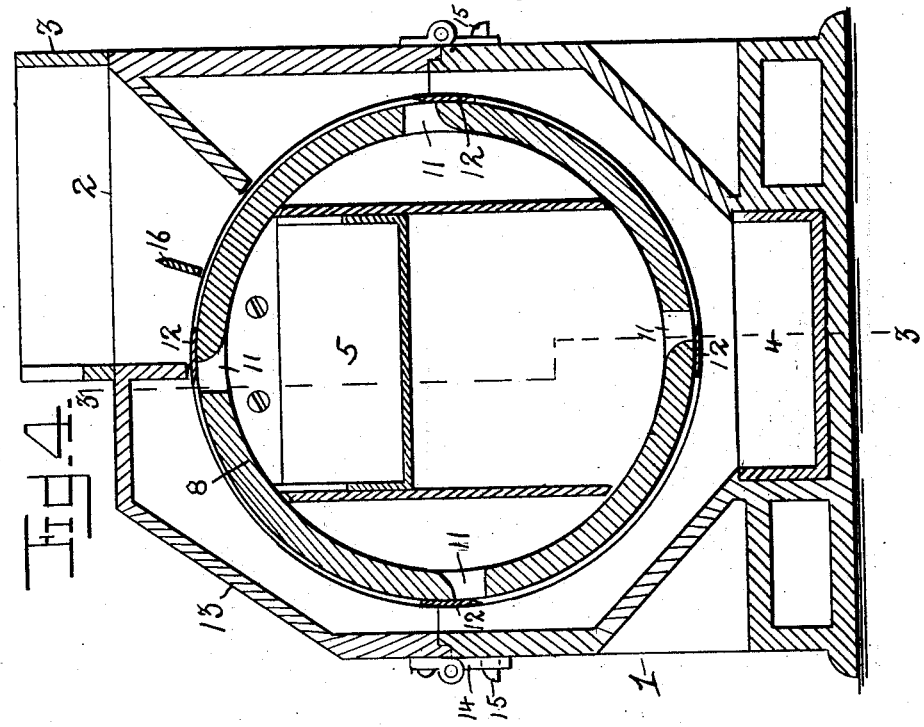
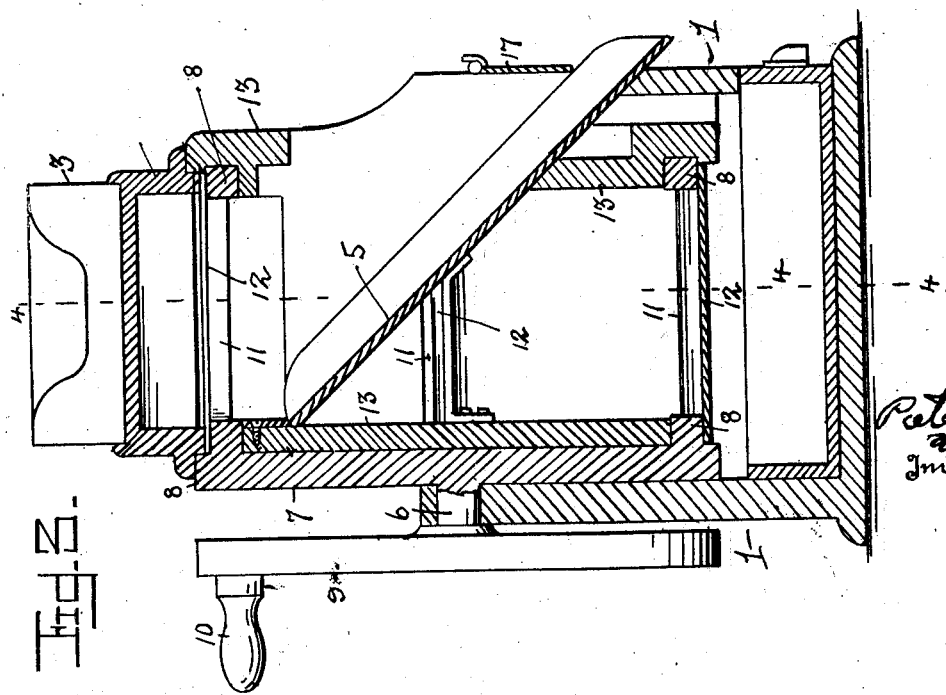
Peter Iverson
Inventor March 22, 1932.  P. IVERSON  1,850,109

VEGETABLE SLICER

Filed July 11, 1929  3 Sheets-Sheet 3

Peter Iverson
Inventor

Patented Mar. 22, 1932

1,850,109

UNITED STATES PATENT OFFICE

PETER IVERSON, OF KINDRED, NORTH DAKOTA, ASSIGNOR OF ONE-HALF TO SAMUEL GRANGARD, OF KINDRED, NORTH DAKOTA

VEGETABLE SLICER

Application filed July 11, 1929. Serial No. 377,516.

This invention relates to vegetable cutters or slicers and it consists in the novel features hereinafter described and claimed.

A primary object of the invention is to provide a slicer having a revolving drum provided with slicing knives or blades and with a delivery chute housed within the drum and disposed downwardly toward a receptacle into which the slices are deposited.

Another object of the invention is to provide a slice cutter of simple structure comprising a casing provided at its top side with a hopper. A hollow cylindrical drum is journaled in the casing and is located under the hopper. A crank is provided for rotating the drum. The periphery of the drum is provided at spaced intervals with obliquely disposed openings and cutting blades are disposed over the said openings. A chute is located in the casing and extends up into the drum. A drawer is slidably mounted in the lower portion of the casing to receive any of the sliced material which may be carried past the chute.

In the accompanying drawings,

Figure 1 is a front elevational view of my device.

Figure 2 is a side elevational view.

Figure 3 is a section on line 3—3 of Figure 4.

Figure 4 is a section on line 4—4 of Figure 3.

Figure 6:
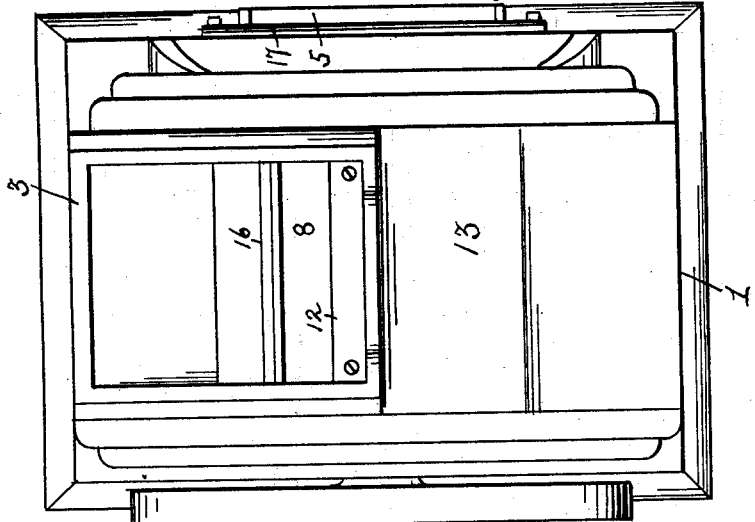
Figure 6 is a plan view of the apparatus.
Figure 5:
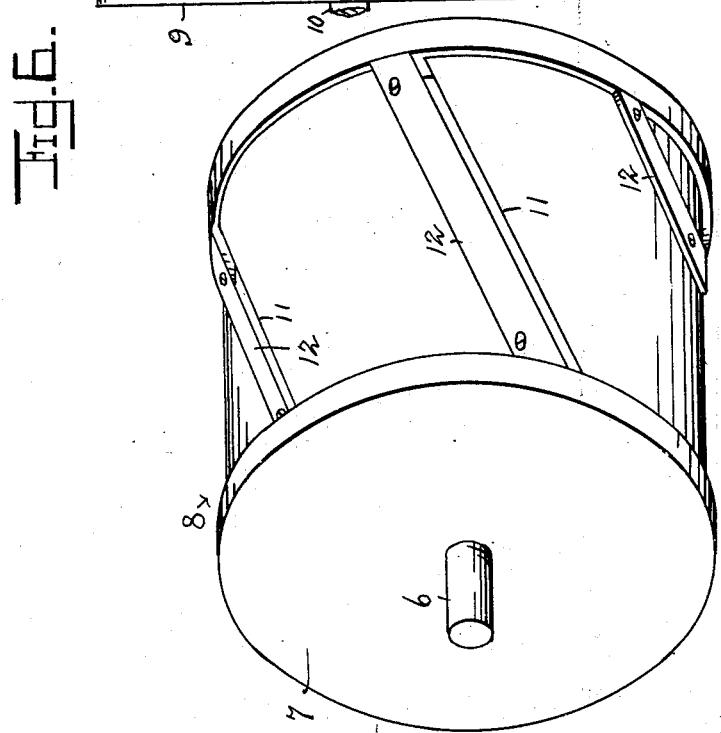
Figure 5 is a detail perspective view of a slicer drum.

The vegetable slicer comprises a casing 1, provided at its top side with an opening 2 and having a hopper 3 mounted thereon. A drawer 4 is slidably mounted in the lower portion of the casing. An upwardly inclined chute 5 is located in the casing above the drawer 4.

A stub shaft 6 is journaled in the side of the casing and the head 7 of a hollow cylindrical drum 8 is fixed to the inner end of said shaft. A fly wheel 9 is mounted upon the stub shaft and a crank handle 10 is mounted upon the fly wheel.

The drum 8 is provided at its periphery with a series of obliquely disposed openings 11. Knife blades 12 are disposed over the openings 11. The chute 5 extends up into the drum. The edge of the opening 2 serves as a hold back abutment for the blades to cut the vegetables against. The vegetables are placed in the hopper 3 and the drum is turned by the operator using the handle 10. As the edges of the blades come in contact with the vegetables the slices are cut and these slices slide down along the chute 5 and fall into a suitable receptacle, not shown, beneath the lower end of the chute, while the sliced material which may be carried over the outer face of the drum, fall into the drawer 4, which may be removed when required. The casing is provided with a removable top section 13 having hasp members 14 pivoted at its ends.

The hasp members engage over cleats 15 mounted upon the lower portion of the casing. By removing the top section the blades may be removed from the drum for sharpening or other purposes.

A stationary blade 16 is disposed transversely within the hopper 3 and operative to manually sever the material to be sliced to facilitate the operation.

A swinging stop plate 17 is disposed above the discharge end of the chute 5 to retard the sliced material and prevent it from flooding the receptacle.

Having described the invention what is claimed is:

1. In a device of the character described, a casing, a drum rotatably mounted within the casing and having a stub shaft projecting through the casing, a fly wheel mounted on said shaft, a crank handle at the periphery of said fly wheel, said drum having a series of slots and knives fixedly mounted on said drum and overlying said slots, a hopper mounted above said drum and an upright knife blade mounted within said hopper to sever the material to be fed to the said knives, and a chute mounted within said drum and projecting through an opening in the side thereof.

2. The devices as claimed in claim 1, and a swinging retarder plate to control the passage of material from said chute.

3. A device of the character described comprising a casing, a drum having a solid side wall, a stub shaft projecting therefrom, and mounted in said casing, a fly wheel fixed to said shaft and forming a counter-balance for said drum, a series of cutter blades carried by said drum, and a crank handle on said counter-balance, said drum having its opposite side open and an inclined chute projecting from the upper portion of said drum and through said opening, and a hopper for said casing and a substantially vertically disposed knife blade extending across said hopper.

In testimony whereof I affix my signature.

PETER IVERSON.